(12) United States Patent
Chen et al.

(10) Patent No.: US 9,123,924 B2
(45) Date of Patent: Sep. 1, 2015

(54) BATTERY CORE AND METHOD OF MANUFACTURING THE SAME

(75) Inventors: Ming-Lung Chen, Hsin-Chu (TW);
Chien-Ming Chen, Hsin-Chu (TW);
Ching-Chou Yu, Hsin-Chu (TW);
Sheng-Fu Wen, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 13/596,299

(22) Filed: Aug. 28, 2012

(65) Prior Publication Data
US 2013/0157142 A1 Jun. 20, 2013

(30) Foreign Application Priority Data

Dec. 20, 2011 (TW) .............................. 100147437 A

(51) Int. Cl.
| | |
|---|---|
| *H01M 4/64* | (2006.01) |
| *H01M 4/04* | (2006.01) |
| *H01M 10/04* | (2006.01) |

(52) U.S. Cl.
CPC ........ *H01M 4/0404* (2013.01); *H01M 10/0431* (2013.01); *Y10T 29/49208* (2015.01)

(58) Field of Classification Search
CPC ........ H01M 4/0404; H01M 4/64; H01M 4/70
USPC ........................................................ 429/233
See application file for complete search history.

(56) References Cited

U.S. PATENT DOCUMENTS

| 4,029,856 | A * | 6/1977 | Cromer et al. .................. 429/94 |
| 5,776,628 | A * | 7/1998 | Kraft et al. ...................... 429/94 |
| 2002/0079045 | A1 | 6/2002 | Parrish et al. |
| 2007/0172736 | A1* | 7/2007 | Fujikawa et al. ............. 429/233 |
| 2010/0247987 | A1* | 9/2010 | Holung et al. .................. 429/62 |

FOREIGN PATENT DOCUMENTS

| CN | 2648615 | 10/2004 |
| CN | 201820857 | 5/2011 |
| CN | 102227031 | 10/2011 |
| TW | 469660 | 12/2001 |
| TW | I343667 | 3/2008 |
| TW | M408136 | 7/2011 |
| WO | WO2009/031037 | * 3/2009 |

* cited by examiner

*Primary Examiner* — Ula C Ruddock
*Assistant Examiner* — Lisa S Park
(74) *Attorney, Agent, or Firm* — WPAT, PC; Justin King

(57) ABSTRACT

A battery core and a method of manufacturing the same are disclosed herein. The battery core includes a first electrode plate and a second electrode plate. The first electrode plate includes a substrate and a first active material. A first portion of the first active material is formed on a first area of the substrate, and a second portion of the first active material is formed on a second area of the substrate. The second electrode plate includes first and second substrates disconnected from each other, and a second active material. The first and second substrates are positioned corresponding to the first and second first areas respectively. A first portion of the second active material is formed on the first substrate, and a second portion of the second active material is formed on the second substrate.

19 Claims, 9 Drawing Sheets

BATTERY CORE AND METHOD OF MANUFACTURING THE SAME

RELATED APPLICATIONS

This application claims priority to Taiwan Application Serial Number 100147437, filed Dec. 20, 2011, which is herein incorporated by reference.

BACKGROUND

1. Field of Invention

The present invention relates to a secondary battery and a manufacturing method of the same. More particularly, the present invention relates to a battery core and a manufacturing method of the same.

2. Description of Related Art

A secondary battery is a battery which can be recharged. There are various types of secondary batteries that vary in structural design or in material utilized therein. It is not advisable to charge a primary battery due to the risk of explosion of the battery. Some secondary batteries may be damaged by reverse charging as a result of being totally discharged, while some secondary batteries have to be totally discharged periodically. Today, secondary batteries are widely used in various kinds of electrical devices with low power requirements, such as car starters, mobile apparatuses, uninterruptible power supplies, etc. Moreover, the requirements of low cost and weight, and increased lifetime of secondary batteries used in hybrid vehicles and electric vehicles have been such that the technology of this field continues to improve.

In recent years, secondary batteries have been widely used as the power source in mobile electrical apparatuses. Among the different types of secondary batteries, the demand for lithium secondary batteries has been steadily increasing due to their characteristics of high energy density, high discharge voltage, and good power output stability.

A secondary battery usually includes a plurality of battery cores connected in series to satisfy the voltage and power requirements of various devices. In addition, because of the charge-discharge characteristics of the secondary battery and the fact that there are differences between the battery cores, an electrical balancing control of each battery core in the secondary battery is needed, so as to avoid overcharging or overdischarging of the battery cores which may cause early failure of the secondary battery.

SUMMARY

One aspect of the invention is to provide a battery core and a manufacturing method of the same, so as to provide a structure to balance the electricity within battery cores.

According to one embodiment of the invention, a battery core includes a first electrode plate, a second electrode plate, and first and second separators. The first electrode plate includes a substrate and a first active material. The substrate has a first area and a second area. The first active material has a first portion and a second portion, in which a first portion of the first active material is formed on the first area, and a second portion of the first active material is formed on the second area. The second electrode plate includes a first substrate, a second substrate, and a second active material, in which the first substrate and the second substrate are disconnected. The first substrate is positioned corresponding to the first area of the first electrode plate. The second substrate is positioned corresponding to the second area of the first electrode plate. The second active material has a first portion and a second portion, wherein the first portion of the second active material is formed on the first substrate, and the second portion of the second active material is formed on the second substrate. The first separator is disposed between the first and the second electrode plate.

The second electrode plate mentioned above further comprises two conductive handles. One of second conductive handles is disposed on an end of the first substrate, wherein the end of the first substrate is close to an end of the second substrate, and another handle is disposed on another end of the second substrate. The second portion of the second active material is located between the two second conductive handles.

According to one embodiment of the invention, a method of manufacturing a battery core includes a plurality of steps. A first electrode plate is formed. A second electrode plate is formed. The first electrode plate, a first separator, the second electrode plate, and a second separator are stacked and then wound. The step of forming the first electrode plate includes the step of separately forming a first portion of a first active material and a second portion of the first active material on a substrate. The step of forming the second electrode plate includes the step of respectively forming a first portion of a second active material and a second portion of the second active material on a first substrate and a second substrate, wherein the first and the second substrate are continuous. In the step of stacking and then winding the first electrode plate, the first separator, the second electrode plate, and the second separator, the first substrate and the second substrate are disconnected to form the battery core while winding the first electrode plate, the first separator, the second electrode plate, and the second separator.

The following paragraphs will provide specific details of the aforementioned description with some embodiments to interpret the techniques of the present invention.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
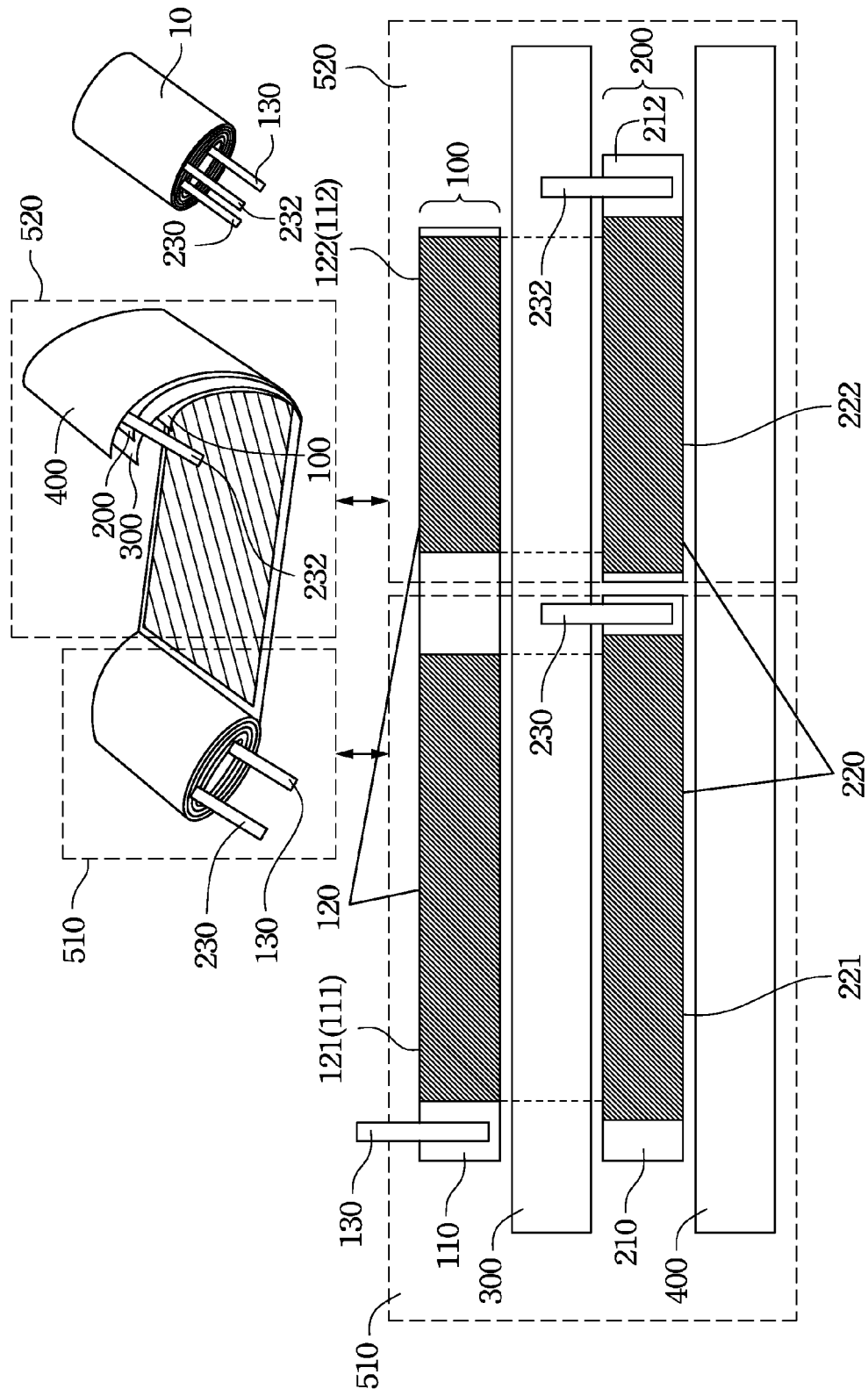
FIG. 1 is a schematic diagram of a battery core according to a first embodiment of the present invention.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

As used in the description herein and throughout the claims that follow, the meaning of "a," "an," and "the" includes reference to the plural unless the context clearly dictates otherwise. Also, as used in the description herein and throughout the claims that follow, the terms "comprise" or "comprising," "include" or "including," "have" or "having," "contain" or "containing" and the like are to be understood to be open-ended, i.e., to mean including but not limited to. Also, as used in the description herein, the range of error to the values modified by the term "substantially" is generally 20%, and it can be 10% in some preferred cases, and moreover, it can also be 5% in some most preferred cases.

An aspect of the present invention is a battery core, which can be applied to a secondary battery or to various kinds of battery-related technologies. It is noted that electricity within the battery core disclosed herein can be balanced automatically. The following paragraphs will describe various exemplary embodiments of the battery core together with reference to the drawings.

FIG. 1 is a schematic diagram of a battery core 10 according to a first embodiment of the present invention. The battery core 10 includes a first electrode plate 100, a second electrode plate 200, a first separator 300, and second separator 400. The second electrode plate 200 is disposed to one side of the first electrode plate 100 (below the first electrode plate 100 in FIG. 1). The first separator 300 is disposed between the first electrode plate 100 and the second electrode plate 200.

Figure 3:
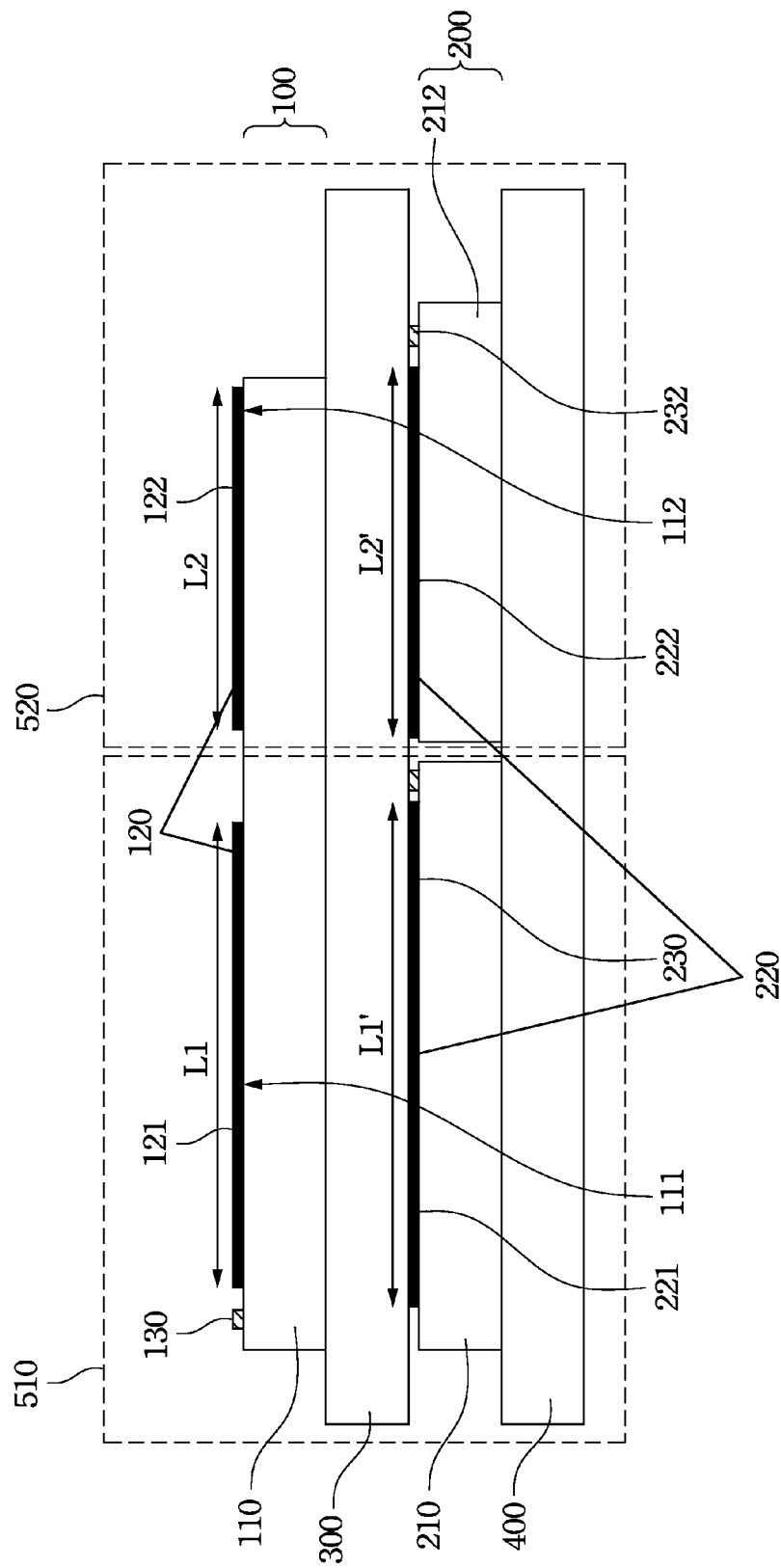
FIG. 3 is a side view of the battery core in FIG. 1 in which a first electrode plate, a first separator, a second electrode plate, and a second separator are shown in a stacked state.

In FIG. 1, the second separator 400 is disposed on one side of the second electrode plate 200, such that the second electrode plate 200 is disposed between the first separator 300 and the second separator 400. In the first embodiment, the first electrode plate 100 is a positive electrode plate (e.g. an anode plate), and the second electrode plate 200 is a negative electrode plate (e.g. a cathode plate). An area of a first portion 121 of a first active material 120 of the first electrode plate 100 is equal to or smaller than an area of a first portion 221 of a second active material 220 of the second electrode plate 200, such that the first portion 221 of the second active material 220 can entirely overlay the first portion 121 of the first active material 120. FIG. 3 is a side view of the battery core 10 in FIG. 1 in which the first electrode plate 100, the first separator 300, the second electrode plate 200, and the second separator 400 are shown in a stacked state. As shown in FIG. 3, a length L1 of the first portion 121 of the first active material 120 is shorter than a length L1' of the first portion 221 of the second active material 220.

Similarly, an area of a second portion 122 of the first active material 120 of the first electrode plate 100 is equal to or smaller than an area of a second portion 222 of the second active material 220 of the second electrode plate 200, to such that the second portion 222 of the second active material 220 can entirely overlay the second portion 122 of the first active material 120. As shown in FIG. 3, a length L2 of the second portion of the first active material 120 is shorter than a length L2' of the second portion 221 of the second active material 220.

Because the first electrode plate 100 is a positive electrode plate in the first embodiment, the first active material 120 is mainly composed of metal oxides, and the second active material 220 is mainly composed of carbon materials. In addition, because of the differences in the areas as described above, the metal oxides within the first active material 120 can operate normally. That is, if the area of the first portion 121 of the first active material 120 were larger than the area of the first portion 221 of the second active material 220, then some part of the first portion 121 of the first active material 120 would not be covered by the first portion 221 of the second active material 220, such that the non-covered metal oxide could be damaged or shorted by the accumulation of charged ions. Similarly, if the area of the second portion 122 of the first active material 120 were larger than the area of the second portion 222 of the second active material 220, then some part of the second portion 122 of the first active material 120 would not be covered by the second portion 222 of the second active material 220, such that the non-covered metal oxide could be damaged or shorted by the accumulation of charged ions.

Figure 4:
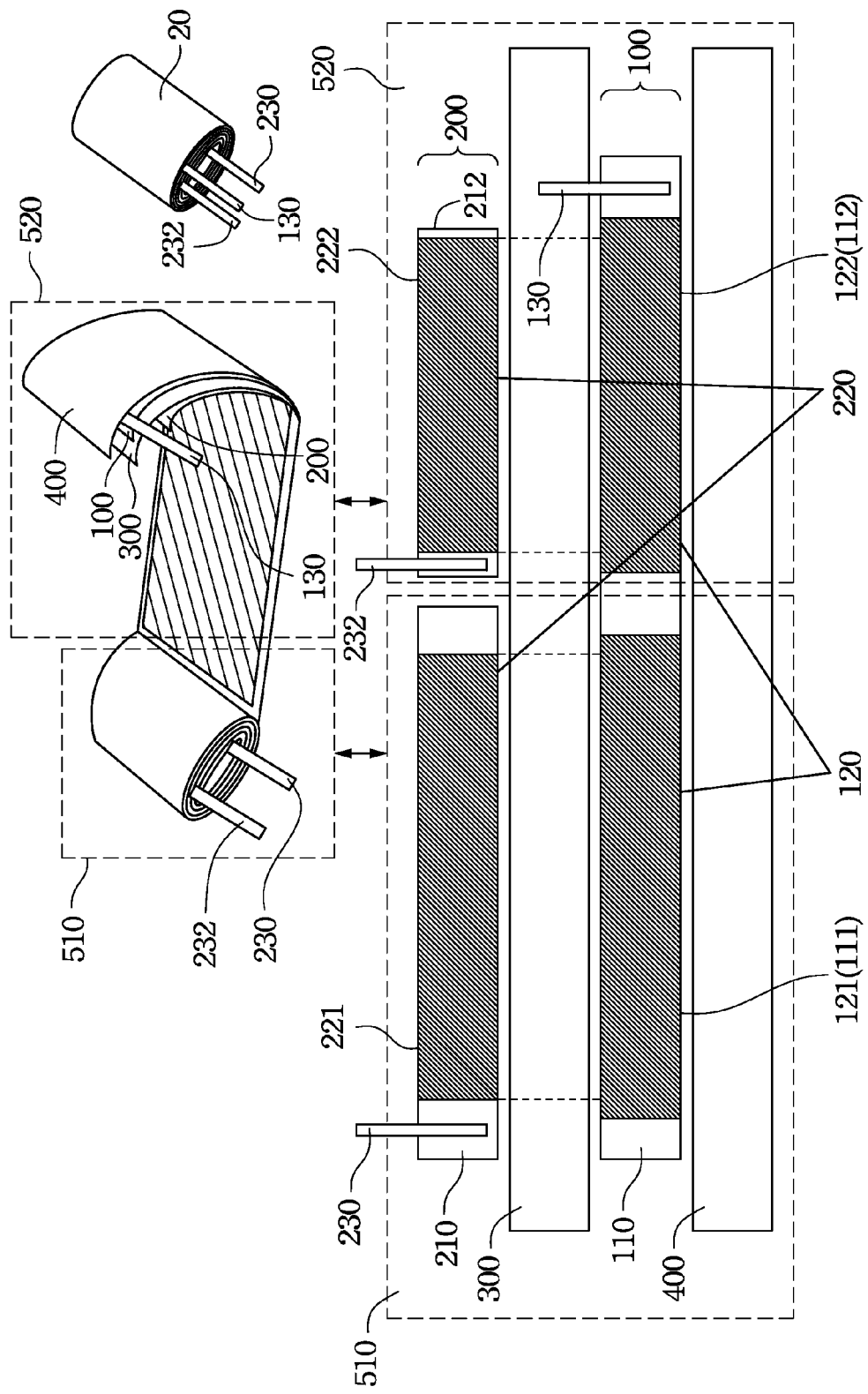
FIG. 4 is a schematic diagram of a battery core according to a second embodiment of the present invention.

FIG. 4 is a schematic diagram of a battery core 20 according to a second embodiment of the present invention. As shown in FIG. 4, except for the position of the first electrode plate 100 and the second electrode plate 200 being interchanged, the structure of the battery core 20 is similar to the battery core 10.

In FIG. 4, the second separator 400 is disposed on one side of the first electrode plate 100, such that the first electrode plate 100 is disposed between the first separator 300 and the second separator 400. In the second embodiment, the first electrode plate 100 is a negative electrode plate, and the second electrode plate 200 is a positive electrode plate. An area of the first portion 121 of the first active material 120 of the first electrode plate 100 is equal to or larger than an area of the first portion 221 of the second active material 220 of the second electrode plate 200, such that the first portion 121 of the first active material 120 can entirely overlay the second portion 221 of the first active material 220. Similarly, an area of the second portion 122 of the first active material 120 of the first electrode plate 100 is equal to or larger than an area of the second portion 222 of the second active material 220 of the second electrode plate 200, such that the second portion 122 of the first active material 120 can entirely overlay the second portion 222 of the second active material 220.

Because the second electrode plate 200 is a positive electrode plate in the second embodiment, the second active material 220 is mainly composed of metal oxides, and the first active material 120 is mainly composed of carbon materials. In addition, because of the differences in the areas described above, the metal oxides within the second active material 220 can operate normally. That is, if the area of the first portion 221 of the second active material 220 were larger than the area of the first portion 121 of the first active material 120, then some part of the first portion 221 of the second active material 220 would not be covered by the first portion 121 of the first active material 120, such that the non-covered metal oxide could be damaged or shorted by the accumulation of charged ions. Similarly, if the area of the second portion 222 of the second active material 220 were larger than the area of the second portion 122 of the first active material 120, then some part of the second portion 222 of the second active material 220 would not be covered by the second portion 122 of the first active material 120, such that the non-covered metal oxide could be damaged or shorted by the accumulation of charged ions.

During manufacture, In the case of the configuration of FIG. 1, the first electrode plate 100, the first separator 300, the second electrode plate 200, and the second separator 400 are stacked and then wound to form the battery core 10, in which the first separator 300 insulates the first electrode plate 100 and the second electrode plate 200, the second separator 400 insulates the second electrode plate 200 from the wound first electrode plate 100. In the case of the configuration of FIG. 4, the second electrode plate 200, the first separator 300, the first electrode plate 100, and the second separator 400 are stacked and then wound to form the battery core 20, in which the first separator 300 insulates the first electrode plate 100 and the second electrode plate 200, and the second separator 400 insulates the first electrode plate 100 from the wound second electrode plate 200.

More particularly, the manufacturing method mentioned above includes a number of steps. (a) The first electrode plate 100 is formed. (b) The second electrode plate 200 is formed. (c) The first electrode plate 100, the first separator 300, the second electrode plate 200, and the second separator 400 are stacked and then wound. The step of forming the first electrode plate 100 includes the step of separately forming the first portion 121 of the first active material 120 and the second portion 122 of the first active material 120 on a substrate 110. The step of forming the second electrode plate 200 includes the step of respectively forming the first portion 221 of the second active material 220 and the second portion 222 of the second active material 220 on a first substrate 210 and a second substrate 212, wherein the first and second substrates 210, 212 are continuous. Subsequently, stacking and then winding the first electrode plate 100, the first separator 300, the second electrode plate 200, and the second separator 400 are performed, wherein the first substrate 210 and the second substrate 212 are physically disconnected to form the battery core 10 while winding the first electrode plate 100, the first separator 300, the second electrode plate 200, and the second separator 400.

Because the first substrate 210 and the second substrate 212 are disconnected, the battery core 10 can be divided into a main capacity part 510 and a balancing capacity part 520. The main capacity part 510 of the battery core 10 includes the first portion 121 of the first active material 120, a first area 111 of the substrate 110, the first portion 221 of the second active material 220, and the first substrate 210. The balancing capacity part 520 of the battery core 10 includes the second portion 122 of the first active material 120, a second area 112 of the substrate 110, the second portion 222 of the second active material 220, and the second substrate 212.

The balancing capacity part 520 of the battery core 10 can be utilized to balance the electricity in the main capacity part 510 of the battery core 10. For example, when the main capacity part 510 of the battery core 10 is overcharged, the excess electricity can be delivered to the balancing capacity part 520 of the battery core 10. On the other hand, when the main capacity part 510 of the battery core 10 is overly discharged, the electricity stored in the balancing capacity part 520 of the battery core 10 can be returned back to the main capacity part 510 of the battery core 10. In this manner, the electricity within the battery core 10 can be balanced.

In FIG. 1, the first electrode plate 100 includes the substrate 110 and the first active material 120. With this structure, the first portion 121 of the first active material 120 belonging to the main capacity part 510 of the battery core 10 is formed on the first area 111, and the second portion 122 of the first active material 120 belonging to the balancing capacity part 520 of the battery core 10 is formed on the second area 112.

If the first electrode plate 100 is a positive electrode plate, the first active material 120 is mainly composed of metal oxides, such as lithium oxides (for example, LiCoO$_2$.) In addition, the first active material 120 may also include conducting material, an adhesive, and other materials. For example, a weight percent of metal oxides within the first portion 121 of the first active material 120 may be more than 85%, and a weight percent of metal oxides within the second portion 122 of the first active material 120 may be more than 80%.

If the first electrode plate 100 is a negative electrode plate, the first active material 120 is mainly composed of carbon materials, such as graphite. In addition, the first active material 120 may also include conducting material, an adhesive, and other materials. For example, a weight percent of carbon materials within the first portion 121 of the first active material 120 may be more than 90%, and a weight percent of carbon materials within the second portion 122 of the first active material 120 may be more than 85%.

Figure 2:
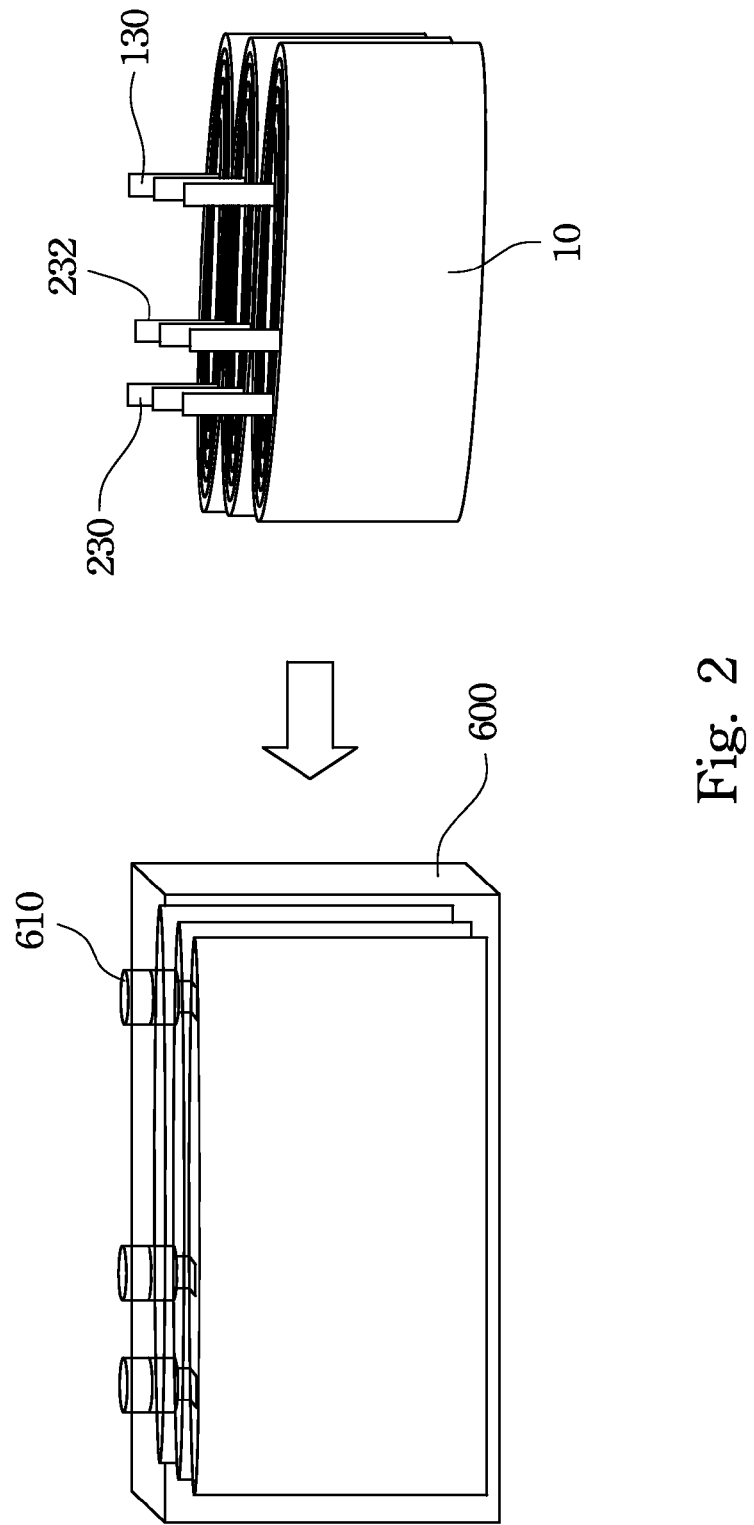
FIG. 2 is a schematic diagram of a secondary battery constructed with the battery core in FIG. 1.
Figure 5:
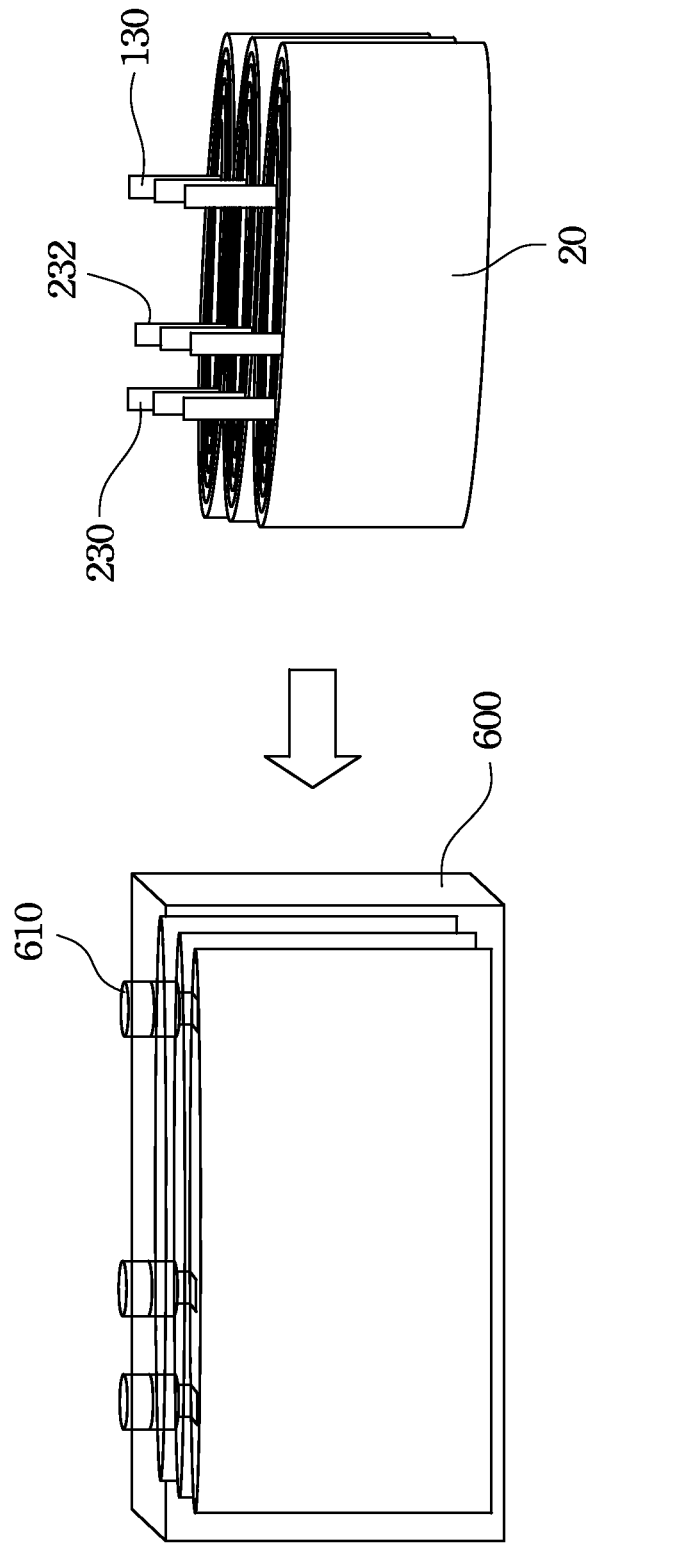
FIG. 5 is a schematic diagram of a secondary battery constructed with the battery core in FIG. 4.

The first electrode plate 100 also includes a first conductive handle 130. The first conductive handle 130 is disposed on an end of the substrate 110, that is, an end of the substrate 110 which is close to the first area 111. In practice, as shown in FIG. 2 and FIG. 5, a plurality of the first conductive handles 130 of the battery cores 10, 20 are connected to one place (such as through a locking mechanism or by welding), in which the "place" may be an endpoint of an upper cap 610 or a housing 600. The endpoint of the upper cap 610 or the housing 600 may be insulated. If the first plate 100 is a positive electrode plate, as shown in FIG. 2, the first conductive handle 130 may be a positive electrode handle. On the other hand, if the first plate 100 is a negative electrode plate, as shown in FIG. 5, the first conductive handle 130 may be a negative electrode handle.

To make the speed of charging and discharging of the balancing capacity part 520 of the battery core 10 faster than the speed of charging and discharging of the main capacity part 510, a thickness of the first portion 121 of the first active material 120 is substantially bigger than a thickness of the second portion 122 of the first active material 120. In addition, a content ratio of the conducting material of the first portion 121 of the first active material 120 is substantially smaller than a content ratio of the conducting material of the second portion 122 of the first active material 120. Through such a configuration, the balancing capacity part 520 of the battery core 10 can be utilized to balance the electricity in the main capacity part 510 of the battery core 10 efficiently.

In FIG. 1, the second electrode plate 200 includes the first substrate 210, a second substrate 212, and a second active material 220. The first substrate 210 is positioned corresponding to the first area 111 of the first electrode plate 110. The second substrate 212 is positioned corresponding to the second area 112 of the first electrode plate 110. The first portion 221 of the second active material 220 belonging to the main capacity part 510 of the battery core 10 is formed on the first substrate 210. The second portion 222 of the second active material 220 belonging to the balancing capacity part 520 of the battery core 10 is formed on the second substrate 212.

If the second electrode plate 200 is a negative electrode plate, the second active material 220 is mainly composed of carbon materials, such as graphite. In addition, the second active material 220 may also include conducting material, an adhesive, and other materials. A weight percent of carbon materials within the second portion 221 of the second active material 220 may be more than 90%, and a weight percent of carbon materials within the second portion 222 of the second active material 220 may be more than 85%.

If the second electrode plate 200 is a positive electrode plate, the second active material 220 is mainly composed of metal oxides, such as lithium oxides (for example, LiCoO$_2$.) In addition, the second active material 220 may also include conducting material, an adhesive, and other materials. A weight percent of metal oxides within the first portion 221 of the second active material 220 may be more than 85%, and a weight percent of metal oxides within the second portion 222 of the second active material 220 may be more than 80%.

The second electrode plate 200 also includes a second conductive handle 230 and another second conductive handle 232. The second conductive handle 230 is disposed on an end of the first substrate 210, that is, an end of the first substrate 210 which is close to an end of the second substrate 212. Another second conductive handle 232 is disposed on another end of the second substrate 212. With this configuration, the second portion 222 of the second active material 220 is located between the two second conductive handles 230, 232. In practice, as shown in FIG. 2 and FIG. 5, the conductive handles 230, 232 of the first and second substrates 210, 212 of the second electrode plate 200 are separately connected to different places (such as through a locking mechanism or by welding). The end points of the two different places are insulated from each other, and both of the points are insulated from the first conductive handle 130. For example, if the second plate 200 is an anode plate, the second conductive handles 230, 232 may be two anode handles. On the other hand, if the second plate 200 is a cathode plate, the second conductive handles 230, 232 may be two cathode handles.

In practice, one or more battery core(s) may be disposed in a battery housing or a package, and electrodes with the same electrical polarity are connected together.

To make the speed of charging and discharging of the balancing capacity part 520 of the battery core 10 faster than the speed of charging and discharging of the main capacity part 510, a thickness of the first portion 221 of the second active material 220 is substantially bigger than a thickness of the second portion 222 of the second active material 220. In addition, a content ratio of the conducting material of the first portion 221 of the second active material 220 is substantially smaller than a content ratio of the conducting material of the second portion 222 of the second active material 220. Through such a configuration, the balancing capacity part 520 of the battery core 10 can be utilized to balance the electricity in the main capacity part 510 of the battery core 10 efficiently.

The main capacity part 510 of the battery core 10 acts as a main component for charging and discharging in the battery core 10, and the balancing capacity part 520 of the battery core 10 acts as an auxiliary component to balance the electricity within the main capacity part 510 of the battery core 10. Therefore, in practice, a ratio between the electrical capacity of the first portion 121 of the first active material 120 and the electrical capacity of the second portion 122 of the first active material 120 is substantially from 50:1 to 5:1. If the ratio between the electrical capacity of the first portion 121 of the first active material 120 and the electrical capacity of the second portion 122 of the first active material 120 is more than 50:1, then the capacity of the balancing capacity part 520 of the battery core 10 may not be sufficient to balance the electricity when the battery core 10 is overly charged or discharged. On the other hand, if the ratio between the electrical capacity of the first portion 121 of the first active material 120 and the electrical capacity of the second portion 122 of the first active material 120 is less than 5:1, then the capacity of the balancing capacity part 520 of the battery core 10 may be excessive, and the high capacity of the balancing capacity part 520 of the battery core 10 would be a waste.

Figure 6:
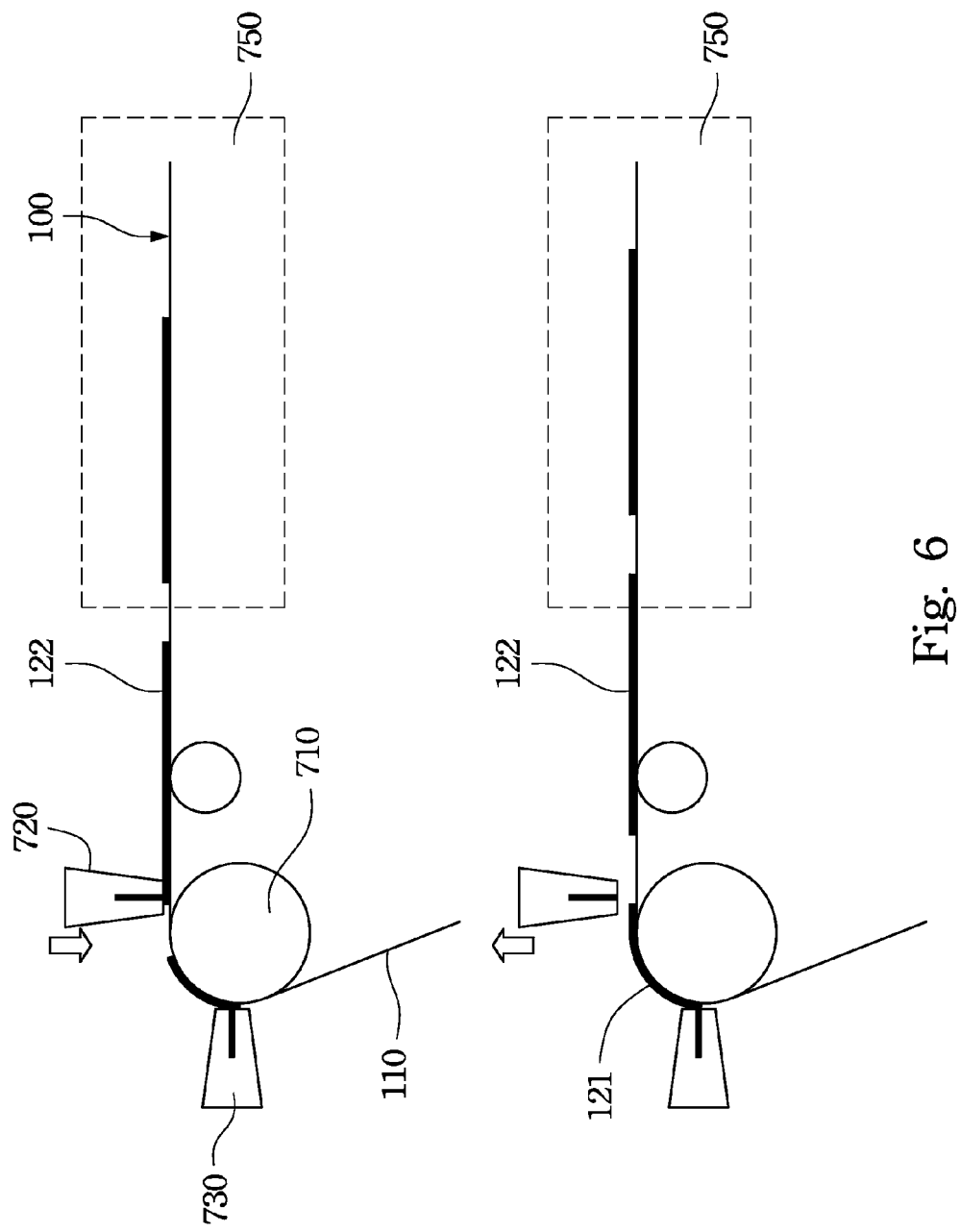
FIG. 6 is a schematic diagram used to describe manufacture of a first electrical plate according to an embodiment of the present invention.

Reference is now made to FIG. 6 which is used for the purpose of describing a method of manufacturing the first electrode plate 100. The step of forming the first electrode plate 100 includes a plurality of steps. (a) The substrate 110 is transported, for example, by a transport roller 710. (b) A mobile coating head 720 is positioned over the substrate 110 with a first predetermined interval therebetween, and then the second portion 122 of the first active material is coated on the substrate 110 by the mobile coating head 720. (c) A fixed coating head 730 is positioned over the substrate 110 with a second predetermined interval therebetween, and then the first portion 121 of the first active material is coated on the substrate 110 by the fixed coating head 730, and the mobile coating head 720 is positioned over the substrate 110 with an interval substantially larger than the second predetermined interval after the second portion 122 of the first active material is coated, so as to prevent the mobile coating head 720 from contacting the first portion 121 of the first active material during the transport process. (d) Subsequently, the first electrode plate 100 is heated in an oven 750 to solidify the first active material.

The first predetermined interval is substantially smaller than the second predetermined interval, such that the second portion 122 of the first active material is substantially thinner than the first portion 121 of the first active material. In addition, a content ratio of the conducting material of the first active material in the mobile coating head 720 is substantially larger than a content ratio of the conducting material of the first active material in the fixed coating head 730. Through such a configuration, the speed of charging and discharging of the balancing capacity part 520 of the battery core 10 can be improved.

Figure 7:
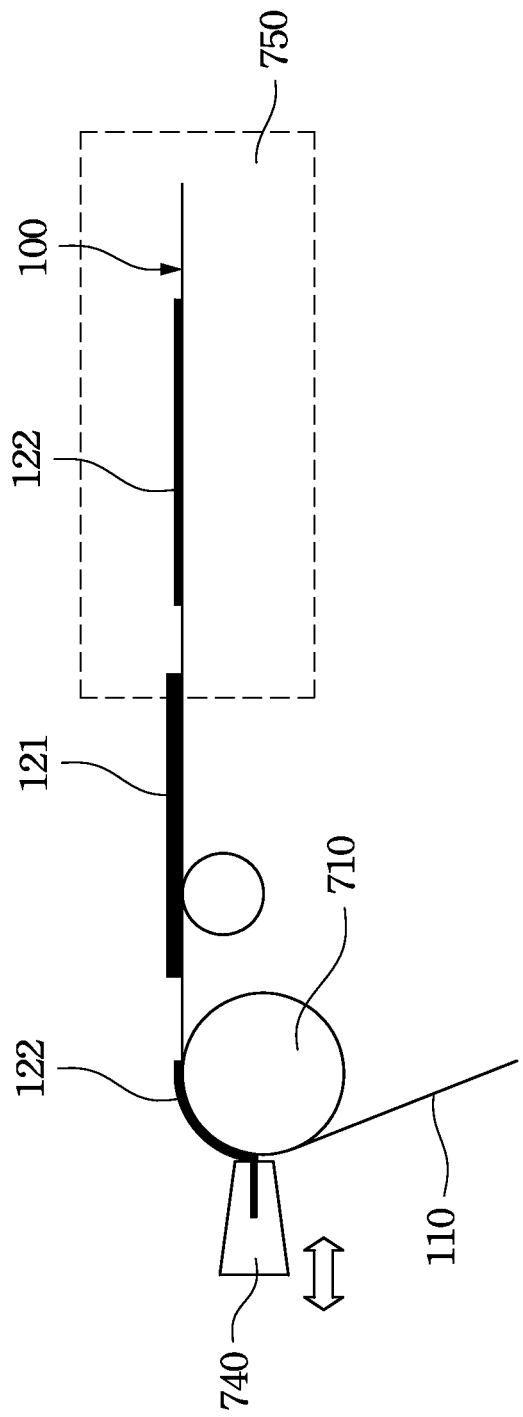
FIG. 7 is a schematic diagram used to describe manufacture of a first electrical plate according to another embodiment of the present invention.

Reference is now made to FIG. 7 which is used for the purpose of describing another method of manufacturing the first electrode plate 100. The step of forming the first electrode plate 100 includes a plurality of steps. (a) The substrate 110 is transported, for example, by a transport roller 710. (b) A mobile coating head 740 is positioned over the substrate 110 with a first predetermined interval therebetween, and then the second portion 122 of the first active material is coated on the substrate 110 by the mobile coating head 740. (c) The mobile coating head 740 is positioned over the substrate 110 with a second predetermined interval therebetween after the second portion 122 of the second active material is coated, and then the first portion 121 of the first active material is coated on the substrate 110 by the mobile coating head 740, in which the first predetermined interval is substantially smaller than the second predetermined interval, such that the second portion 122 of the first active material is substantially thinner than the first portion 121 of the first active material. As a result, the speed of charging and discharging of the balancing capacity part 520 of the battery core 10 is improved. (d) Subsequently, the first electrode plate 100 is heated in an oven 750 to solidify the first active material.

Figure 8:
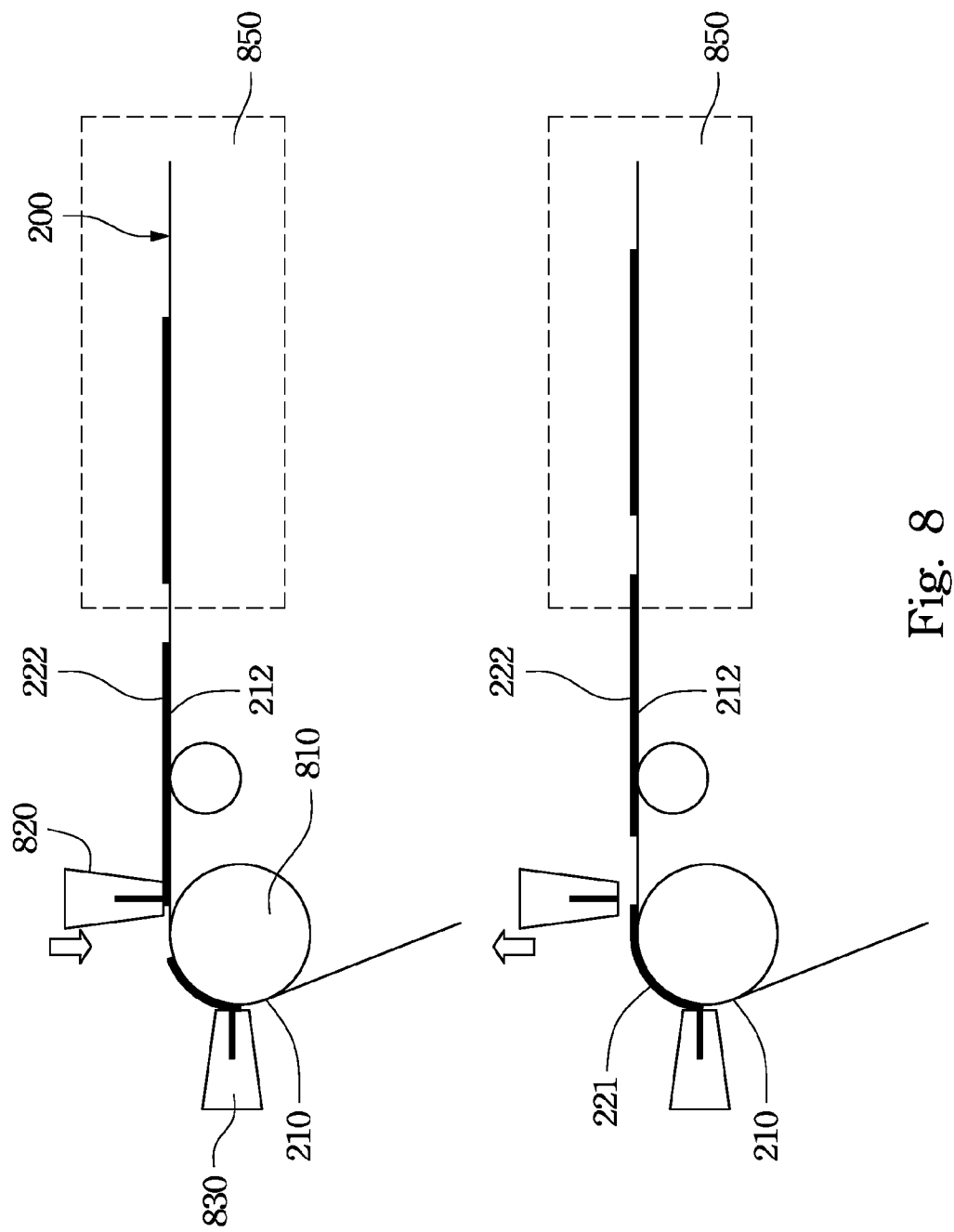
FIG. 8 is a schematic diagram used to describe manufacture of a second electrical plate according to an embodiment of the present invention.

Reference is now made to FIG. 8 which is used for the purpose of describing a method of manufacturing the second electrode plate 200. The step of forming the second electrode plate 200 includes a plurality of steps. (a) The first substrate 210 and the second substrate 212 are transported, for example, by a transport roller 810. (b) A mobile coating head 820 is positioned over the second substrate 212 with a first predetermined interval therebetween, and then the second portion 222 of the second active material is coated on the second substrate 212 by the mobile coating head 820. (c) A fixed coating head 830 is positioned over the first substrate 210 with a second predetermined interval therebetween, and then the first portion 221 of the second active material is coated on the first substrate 210 by the fixed coating head 830, and the mobile coating head 820 is positioned over the first substrate 210 with an interval substantially larger than the second predetermined interval after the second portion 222 of the second active material is coated, so as to prevent the mobile coating head 820 from contacting the first portion 221 of the second active material during the transport process. (d)

Subsequently, the second electrode plate 200 is heated in an oven 850 to solidify the second active material.

Therefore, compared with the conventional art, the invention has at least the following advantages:

1. With the separation of the first substrate and the second substrate, the battery core can be divided into a main capacity part and a balancing capacity part. The main capacity part of the battery core includes the first portion of the first active material, the first area of the substrate, the first portion of the second active material, and the first substrate. The balancing capacity part of the battery core includes the second portion of the first active material, the second area of the substrate, the second portion of the second active material, and the second substrate. When the main capacity part of the battery core is overcharged, the excess electricity can be delivered to the balancing capacity part of the battery core. On the other hand, when the main capacity part of the battery core is overly discharged, the electricity stored in the balancing capacity part of the battery core can be returned back to the main capacity part of the battery core. In this manner, the electricity within the battery core can be balanced.

2. The winding battery core has a small size, has a long life, is low in cost and has a high stability. The first predetermined interval is substantially smaller than the second predetermined interval, such that the second portion 222 of the second active material is substantially thinner than the first portion 221 of the second active material. In addition, a content ratio of the conducting material of the second active material in the mobile coating head 820 is substantially larger than a content ratio of the conducting material of the second active material in the fixed coating head 830. Through such a configuration, the speed of charging and discharging of the balancing capacity part 520 of the battery core 10 can be improved.

Figure 9:
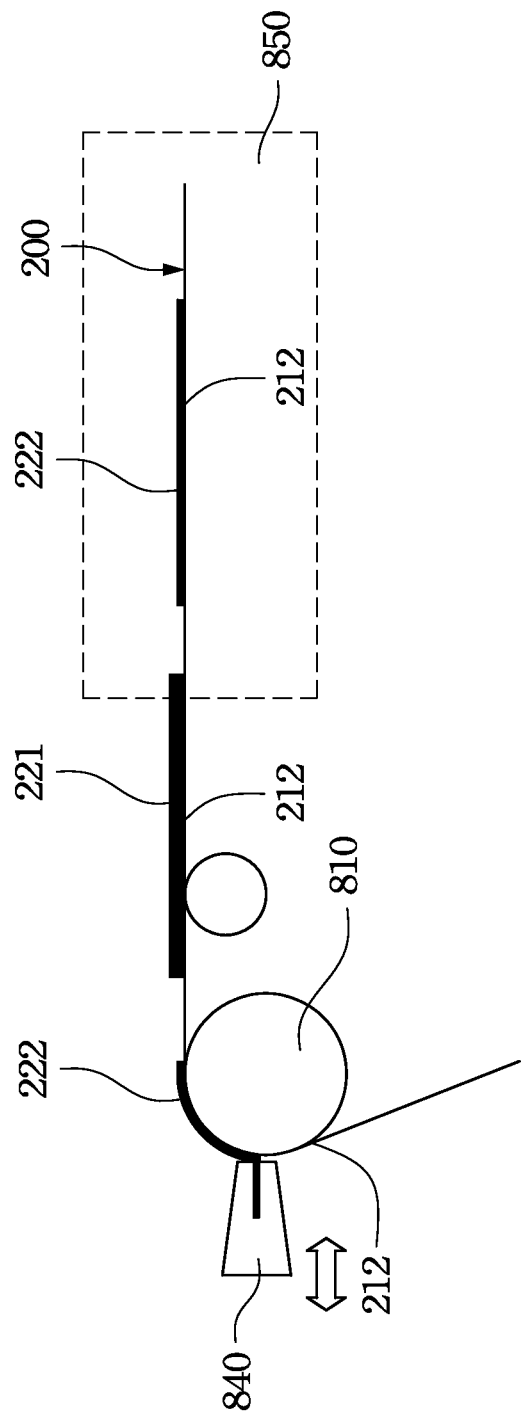
FIG. 9 is a schematic diagram used to describe manufacture of a second electrical plate according to another embodiment of the present invention.

Reference is now made to FIG. 9 which is used for the purpose of describing another method of manufacturing the second electrode plate 200. The step of forming the second electrode plate 200 further includes a plurality of steps. (a) The first substrate 210 and the second substrate 212 are transported, for example, by a transport roller 810. (b) A mobile coating head 840 is positioned over the second substrate 212 with a first predetermined interval therebetween, and the second portion 222 of the second active material is coated on the second substrate 212 by the mobile coating head 840. (c) The mobile coating head 840 is positioned over the first substrate 210 with a second predetermined interval therebetween after the second portion 222 of the second active material is coated, and then the first portion 221 of the second active material is coated on the first foil 210 sheet by the mobile coating head 840, in which the first predetermined interval is substantially smaller than the second predetermined interval to improve the speed of charging and discharging of the balancing capacity part 520 of the battery core 10. (d) Subsequently, the second electrode plate 200 is heated in an oven 850 to solidify the second active material.

Although the present invention has been described in considerable detail with reference to certain embodiments thereof, other embodiments are possible. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A battery core comprising:
   a first electrode plate comprising:
   a substrate having a first area and a second area; and
   a first active material having a first portion having conducting material and a second portion having conducting material, wherein the first portion of the first active material is formed on the first area, the second portion of the first active material is formed on the second area, wherein a thickness of the first portion of the first active material is substantially bigger than a thickness of the second portion of the first active material;
   a second electrode plate disposed on one side of the first electrode plate, comprising:
   a first substrate positioned corresponding to the first area of the first electrode plate;
   a second substrate positioned corresponding to the second area of the first electrode plate, wherein the first and the second substrate are each in direct physical contact with only leads, first active material, and insulating separators; and
   a second active material having a first portion having conducting material and a second portion having conducting material, wherein the first portion of the second active material is formed on the first substrate, and the second portion of the second active material is formed on the second substrate;
   and a first separator disposed between the first and the second electrode plate.

2. The battery core of claim 1, wherein the first electrode plate is a positive electrode plate, the second electrode plate is a negative electrode plate, and an area of the first portion of the first active material is equal to or smaller than an area of the first portion of the second active material, such that the first portion of the second active material can entirely overlay the first portion of the first active material, and an area of the second portion of the first active material is equal to or smaller than an area of the second portion of the second active material, such that the second portion of the second active material can entirely overlay the second portion of the first active material.

3. The battery core of claim 2, further comprising a second separator, wherein the second separator is disposed on one side of the second electrode plate, such that the second electrode plate is disposed between the first separator and the second separator.

4. The battery core of claim 1, wherein the first electrode plate is a negative electrode plate, the second electrode plate is a positive electrode plate, and an area of the first portion of the first active material is equal to or bigger than an area of the first portion of the second active material, such that the first portion of the first active material can entirely overlay the first portion of the second active material, and an area of the second portion of the first active material is equal to or bigger than an area of the second portion of the second active material, such that the second portion of the first active material can entirely overlay the second portion of the second active material.

5. The battery core of claim 4, further comprising a second separator, wherein the second separator is disposed on one side of the first electrode plate, such that the first electrode plate is disposed between the first separator and the second separator.

6. The battery core of claim 1, wherein a content ratio of the conducting material of the first portion of the first active material is substantially smaller than a content ratio of the conducting material of the second portion of the first active material.

7. The battery core of claim 1, wherein a thickness of the first portion of the second active material is substantially bigger than a thickness of the second portion of the second active material.

8. The battery core of claim 1, wherein a content ratio of the conducting material of the first portion of the second active material is substantially smaller than a content ratio of the conducting material of the second portion of the second active material.

9. The battery core of claim 1, wherein the first electrode plate further comprises:
   a first conductive handle disposed on an end of the substrate, wherein the end is close to the first area.

10. The battery core of claim 9, wherein the second electrode plate further comprises:
    a second conductive handle disposed on an end of the first substrate, wherein the end of the first substrate is close to an end of the second substrate; and
    another second conductive handle disposed on another end of the second substrate, wherein the second portion of the second active material is located between the two second conductive handles.

11. A method for manufacturing the battery core as claimed in claim 1, the method comprising:
    forming a first electrode plate, comprising: separately forming a first portion of a first active material and a second portion of the first active material on a substrate;
    forming a second electrode plate, comprising: respectively forming a first portion of a second active material and a second portion of the second active material on a first substrate and a second substrate, wherein the first and the second substrate are continuous; and
    stacking and then winding the first electrode plate, a first separator, the second electrode plate, and a second separator, wherein the first substrate and the second substrate are disconnected to form the battery core while winding the first electrode plate, the first separator, the second electrode plate, and the second separator.

12. The manufacturing method of claim 11, wherein the step of forming the first electrode plate comprises:
    transporting the substrate;
    positioning a mobile coating head over the substrate with a first predetermined interval therebetween, and then coating the second portion of the first active material on the substrate by the mobile coating head; and
    positioning a fixed coating head over the substrate with a second predetermined interval therebetween, and then coating the first portion of the first active material on the substrate by the mobile coating head, and positioning the mobile coating head over the substrate with an interval substantially larger than the second predetermined interval after the second portion of the first active material is coated.

13. The manufacturing method of claim 12, wherein a content ratio of the conducting material of the first active material in the mobile coating head is substantially larger than a content ratio of the conducting material of the first active material in the fixed coating head.

14. The manufacturing method of claim 12, wherein the first predetermined interval is substantially smaller than the second predetermined interval, such that the second portion of the first active material is substantially thinner than the first portion of the first active material.

15. The manufacturing method of claim 11, wherein the step of forming the first electrode plate comprises:
    transporting the substrate;
    positioning a mobile coating head over the substrate with a first predetermined interval therebetween, and then coating the second portion of the first active material on the substrate by the mobile coating head; and
    positioning the mobile coating head over the substrate with a second predetermined interval therebetween after the second portion of the first active material is coated, and then coating the first portion of the first active material on the substrate by the mobile coating head, wherein the first predetermined interval is substantially smaller than the second predetermined interval.

16. The manufacturing method of claim 11, wherein the step of forming the second electrode plate comprises:
    transporting the first substrate and the second substrate, wherein the first and the second substrate are continuous;
    positioning a mobile coating head over the second substrate with a first predetermined interval therebetween, and then coating the second portion of the second active material on the second substrate by the mobile coating head; and
    positioning a fixed coating head over the first substrate with a second predetermined interval therebetween, and then coating the first portion of the second active material on the first substrate by the mobile coating head, and positioning the mobile coating head over the first substrate with an interval substantially larger than the second predetermined interval after the second portion of the second active material is coated.

17. The manufacturing method of claim 16, wherein a content ratio of the conducting material of the second active material in the mobile coating head is substantially larger than a content ratio of the conducting material of the second active material in the fixed coating head.

18. The manufacturing method of claim 16, wherein the first predetermined interval is substantially smaller than the second predetermined interval, such that the second portion of the second active material is substantially thinner than the first portion of the second active material.

19. The manufacturing method of claim 11, wherein the step of forming the second electrode plate comprises:
    transporting the first substrate and the second substrate, wherein the first and the second substrate are continuous;
    positioning a mobile coating head over the second substrate with a first predetermined interval therebetween, and then coating the second portion of the second active material on the second substrate by the mobile coating head; and
    positioning the mobile coating head over the first substrate with a second predetermined interval therebetween after the second portion of the second active material is coated, and then coating the first portion of the second active material on the first substrate by the mobile coating head, wherein the first predetermined interval is substantially smaller than the second predetermined interval.

* * * * *